Figure 1:
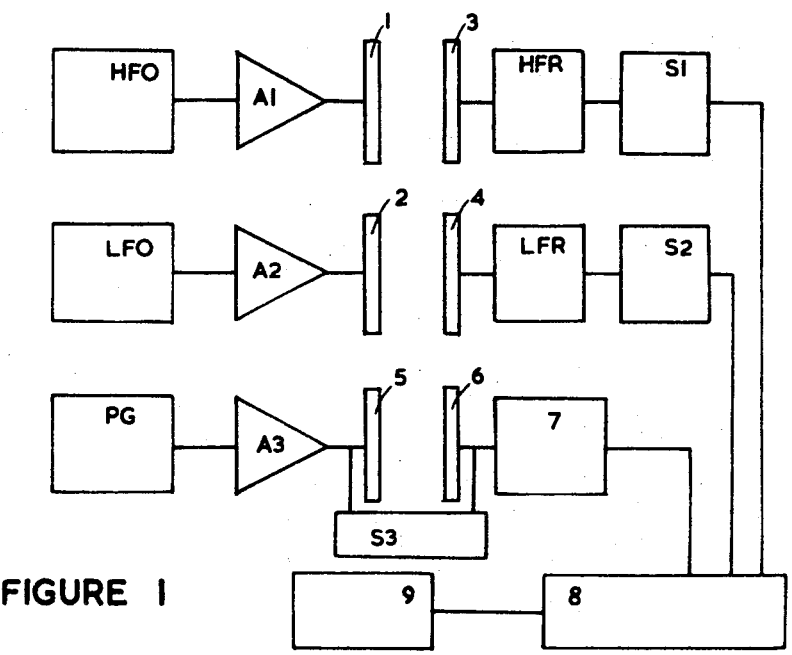

United States Patent
Brown

[15] 3,697,972
[45] Oct. 10, 1972

[54] METAL DETECTION AND ALARM SYSTEMS

[72] Inventor: Yull Brown, 182 Auburn Road, Auburn, New South Wales, Australia

[22] Filed: June 22, 1970

[21] Appl. No.: 47,974

[30] Foreign Application Priority Data

| June 26, 1969 | Australia | 57077/69 |
| June 26, 1969 | Australia | 57078/69 |
| July 11, 1969 | Australia | 57800/69 |
| Aug. 6, 1969 | Australia | 59123/69 |
| Dec. 22, 1969 | Australia | 65563/69 |
| Jan. 12, 1970 | Australia | PA 0058 |

[52] U.S. Cl. ........340/258 R, 340/258 C, 340/258 D, 324/41
[51] Int. Cl. ............................................G08b 13/14
[58] Field of Search...........340/258 R, 258 C, 258 D; 324/41

[56] References Cited

UNITED STATES PATENTS 3,582,931   6/1971   Nawrocki..............340/258 D

Primary Examiner—John W. Caldwell
Assistant Examiner—Michael Slobasky
Attorney—Stevens, Davis, Miller & Mosher

[57] ABSTRACT

A metal detection alarm system detects the presence of an article of a particular metal in a given region by measuring the disturbance of two oscillating electromagnetic fields, one oscillating at from 5 to 20 kHz., the other at from 16 Hz. to 5 kHz., and also of the disturbance of a magnetic field established by D.C. pulses produced at a rate of 0 to 16 pulses per second. Receivers tuned to respond to the electromagnetic and magnetic fields established in the region produce a different response when a metal is present, the change in responses depending upon different parameters of the metal article. The outputs from the receivers are compared with the transmitted signals or in a logic circuit with standard signals and if at least two of the receiver outputs indicate the presence of the particular metal, an alarm is actuated. Applied to revolving doors, apparatus to prevent a person carrying a firearm into a bank or other building, or from entering an aircraft, is obtained. The system can also be used in conjunction with conventional non-revolving doors or with windows. A temperature controller utilizing the change of resistance with temperature of a thermistor is also described. The thermistor is located in the base circuit of a transistor which, in turn, is in a control circuit which determines the length of pulses applied to the gates of two thyristors or silicon controlled rectifiers. The time of switching the thyristors or S.C.R.s and length of pulse controls the supply of power to a heater.

14 Claims, 7 Drawing Figures

3,697,972

METAL DETECTION AND ALARM SYSTEMS

This invention relates to alarm systems and more particularly to alarm systems actuated by a metal object, especially steel. The detection system utilizes the effects on electromagnetic and magnetic fields of the surface, mass and quality of a metal.

The present invention has been developed as a consequence of the need to provide, in certain instances, a warning of a possible armed attack. Two particular uses of the invention, in banks and at airports, spring immediately to mind. The need for adequate alarm systems for banks is one well recognized at the present time, when scarcely a day passes without an armed hold-up being reported. Airport security has also featured prominently in the newspapers recently for there is a clear need to provide a means whereby persons carrying firearms can be prevented from entering an aircraft, for firearms, if carried aboard, are available for use in acts of piracy in the air. These acts of piracy are not uncommon and are often referred to as "hijackings." The present invention is not, however, limited to these two uses but can be incorporated into any location where it would be advantageous to detect the presence of a person carrying a firearm.

Another need, namely the desirability of restraining a would-be armed robber or hijacker with a view to his subsequent arrest, also prompted the development of aspects of the present invention.

It is an object of the present invention to provide an alarm system which will respond to the presence of a metallic object, particularly steel.

According to the present invention, an alarm system comprises a region through or over which a person carrying a metallic object must pass; a first and second oscillator coupled, respectively, to a first and second transmitting coil, each said coil being adapted to produce signals within said region; a first and second receiving coil each responsive to signals within said region and coupled to a first and second receiver, respectively; said first oscillator being adapted to produce a low audio-frequency signal, said second oscillator being adapted to produce a high audio-frequency signal, said first and second receivers being tuned to the frequency of the signals of said first and second oscillators, respectively; a pulse generator adapted to supply D.C. pulses to a magnetic field producing coil to produce a magnetic field within said region, and a third receiving coil coupled to a magnetic flux detector; each of said receivers and said magnetic flux detector being adapted to produce an output signal to be either fed into a logic circuit capable of comparing each said output signal with a respective reference signal or used to actuate a switching device; said logic circuit producing a signal when there is a departure of at least two of said output signals from their respective reference signals or said switching devices providing an output signal on actuation of at least two of said switching devices, said signal from said logic circuit or said switching devices causing actuation of an alarm.

Figure 4:
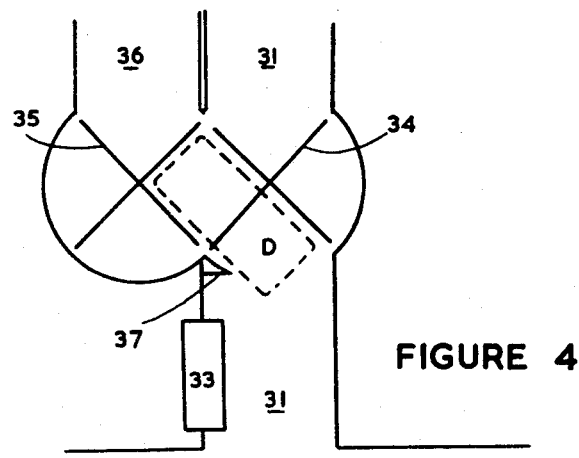
Figure 2A:
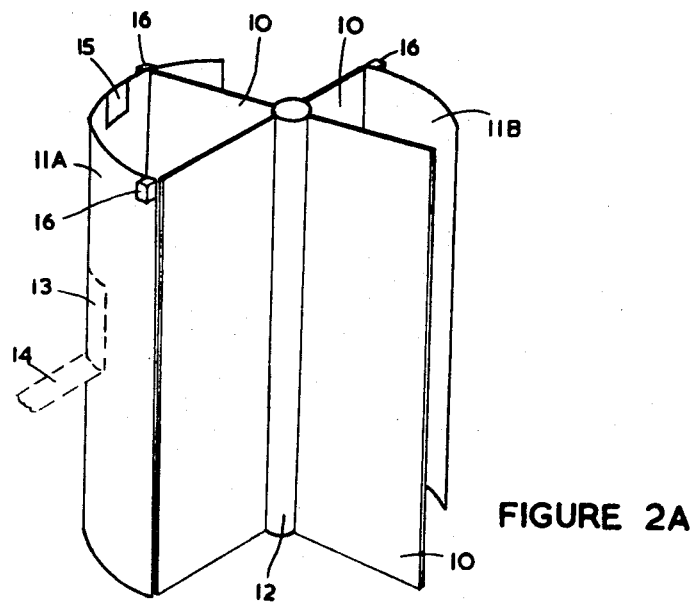
Figure 2B:
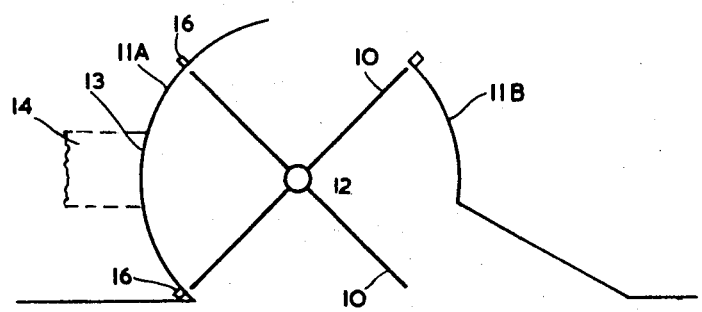
Figure 3:
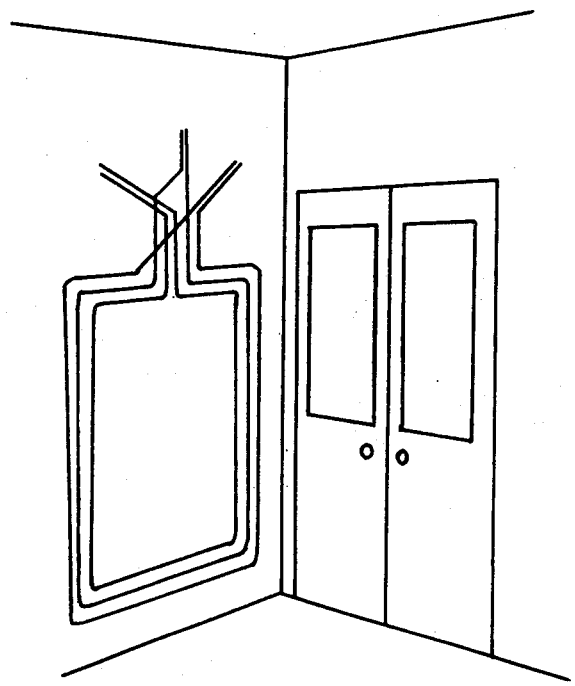
Figure 6:
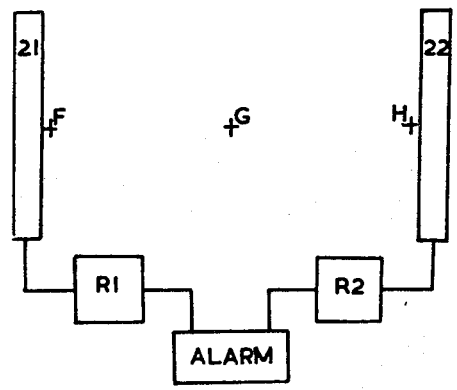
Figure 5:
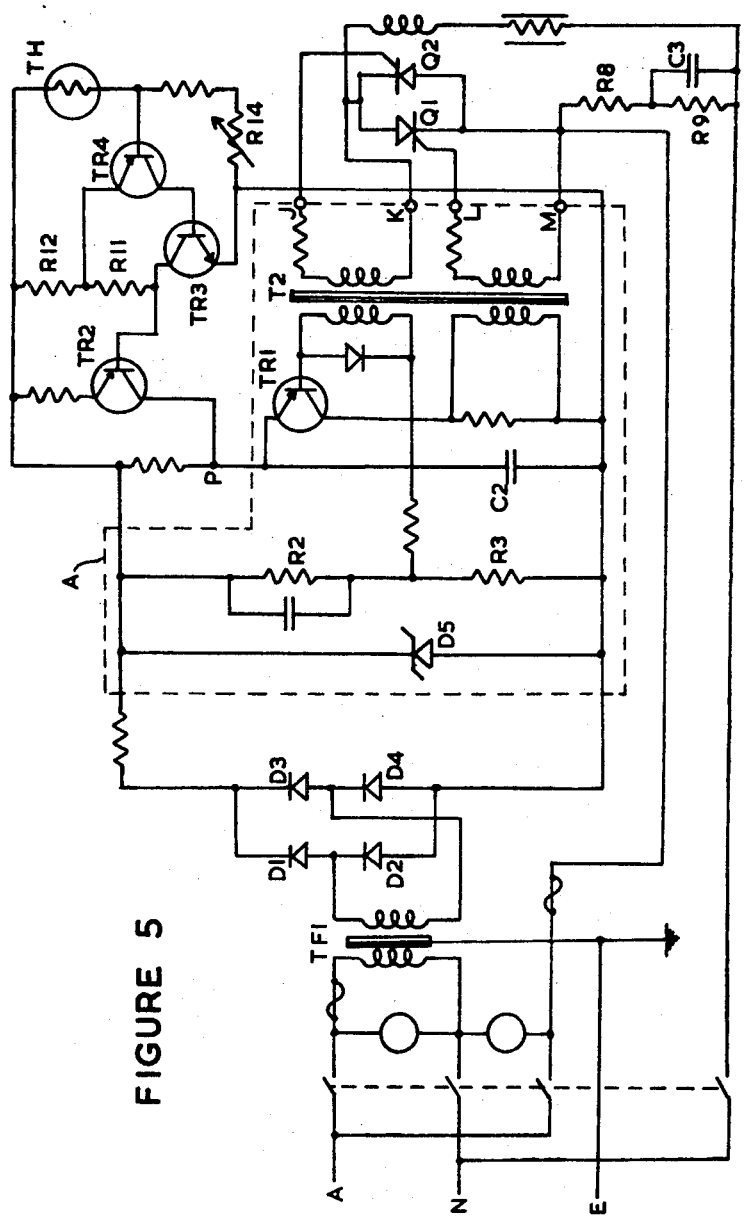

Embodiments of the present invention will now be described with reference to the accompanying drawings, in which:

FIG. 1 is a block diagram illustrating the general inter-relationship of elements included in an alarm system, FIGS. 2A and 2B illustrate, in perspective and plan respectively, a revolving door arrangement with which the alarm system of the present invention may be used, FIG. 3 illustrates a use of the present invention in a situation where a revolving door cannot be used, FIG. 4 illustrates a typical arrangement (not to scale) for an alarm system, constructed in accordance with the present invention, at an airport, FIG. 5 is a circuit diagram of a constant temperature control circuit that may be used with embodiments of the present invention, and FIG. 6 is a schematic representation of receiving aerials in a case where two receiving aerials are used, on opposite sides of a region under surveillance.

The present invention uses the fact that a metal object disturbs electromagnetic and magnetic fields in a manner dependent upon, inter alia, the actual metal of which the object is constructed. For example, a ferromagnetic material has a magnetic permeability which is very much greater than that of pure brass, consequently the effect of introducing a ferromagnetic material into a magnetic field is much more pronounced than the effect of introducing a pure brass object into the same magnetic field. High audio-frequency (in the range 5 kHz. to 20 kHz.) electromagnetic fields are influenced primarily by the surface properties of a metal, low frequency (16 Hz. to 5 kHz.) fields by the mass of the metal involved, and, as already indicated, the constituents of a metal as well as its mass govern the disturbance of a magnetic field.

It is possible, for a given metal to determine the effect of introducing the metal into electromagnetic fields oscillating at particular high and low frequencies. A different metal will influence the electromagnetic fields in a different manner. In the present invention the frequencies of the high and low audio-frequency oscillators HFO and LFO (see FIG. 1), and the frequency to which the high and low audio-frequency receivers HFR and LFR are tuned, are chosen so that there will be a strong, predictable disturbance when a gun is brought within the region under surveillance. This region is within the influence of transmitting coils 1, 2 and receiving coils 3, 4. Coils 1, 2 are driven by the oscillators HFO and LFO, through amplifiers A1 and A2 respectively. A pulse generator PG provides D.C. pulses which are amplified by amplifier A3 and applied to coil 5 to provide a magnetic field within the region under surveillance. Another coil 6, coupled to a magnetic flux meter 7, is used to monitor the magnetic field within the region. The output signals from receivers HFR and LFR, shown here also used to actuate switches S1 and S2, together with the output signal from magnetic flux meter 7 (which may also include a switching device), are fed into logic circuit 8. Here the signals are compared with standard signals. The result of the comparison is the production of an output signal from the logic circuit if at least two of its input signals are found to correspond to the presence of metal of the type the apparatus is designed to detect. This output signal from the logic circuit actuates an alarm 9. Switch S3 switches coil 6 out of the circuit when a D.C. pulse is applied to coil 5, and upon removal of the pulse from coil 5 switches coil 6 into the circuit. In this way a signal is obtained in flux meter 7 only if there is a residual field in the region investigated, which will only be the case when the region contains a material exhibiting remanence — which includes steel — which has been subjected to a magnetic field.

All firearms are constructed of a particular metal — a high carbon content steel. However, the range of metals over which the system will operate will be determinable by adjusting the sensitivity of the receivers and the logic circuit.

Since the invention is suitable for use in a bank, the embodiments of FIGS. 2 and 3 will be assumed to be installations in a bank, although it is stressed that this is not to be regarded as a limitation of the applicability of the invention.

In its preferred form, the alarm system of the present invention is incorporated into a revolving door which permits a single person only to enter the bank. The door of FIGS. 2A and 2B, which will be assumed to rotate clockwise, comprises four panels 10 constructed of a bullet proof perspex or plastics material, such as "Plexiglass" or "Oroglass" (trade marks) produced by Rohm & Haas Company, or other polycarbonate transparent plastics materials.

A bullet-proof glass could be used in the construction of the door but such doors would suffer from certain disadvantages, among which are:
i. protective glass doors are very heavy, weighing typically 200 Kg. per section, i.e., 800 Kg. for a revolving unit;
ii. the glass required to make such doors, being about 2 to 3 cms. thick, is not readily available in all countries and has, in such countries, to be imported, thus increasing the cost of such a door;
iii. the protective glass has to be cut carefully to prevent cracking which would give rise to a loss in the protective feature of the glass;
iv. replacement of a panel of glass in the event of damage is a difficult and costly process for the reasons given above; and
v. if a metal frame surrounds each glass panel, this interferes with the detection coils of the alarm system.

The bullet-proof panels are mounted on a central member 12 which, in this specification, will be termed a spindle. Typically, the panels 1 will be slotted into grooves in spindle 12 although, of course, other methods of joining the panels 10 to spindle 12 can be used. The lower and upper ends of spindle 12 are located rotatively by non metallic bearings (not shown) of any suitable known form.

The panels 10, which, it will be presumed, are of perspex, will typically be 2 to 3 cms. thick. This is a sufficient thickness to prevent penetration of a bullet fired from a 9 mm Luger pistol. Being of perspex, the panels are much lighter than glass, are less expensive than glass, and there is no problem in cutting the panels to size. Furthermore, such panels need no metal frame, indeed, they need no frame at all though one may be provided for aesthetic appeal, in which case it will be non-metallic.

At least one of the side walls 11A, 11B of the door (the left hand one in FIGS. 2A and 2B) is constructed of a bullet-proof material but it need not be transparent. Within this side wall an opening 13 is formed which may have a shute 14 leading away from it. Another preferred feature is to have wall 11B — on the exit side of the revolving door — shortened compared to the corresponding wall of a conventional revolving door by an amount (typically one-third meter) sufficient to allow a person leaving the bank at the same time as a would-be robber is entering the building to step out into the street and not be trapped alongside the armed entrant. No modification of the wall of the building will normally be required to incorporate this feature of the wall 11B.

The wall 11A, however, should be lengthened, compared with the corresponding wall on a conventional revolving door arrangement on the interior side of the doorway to prevent an armed intruder, duly trapped, shooting into the bank through the gap between the wall 11A and the innermost panel 10 stopped with its edge adjacent the wall 11A. Walls 11A and 11B are typically of shot-proof fiberglass or are made of other suitable non-metallic material.

One or more loudspeakers 15 may be located above or within side wall 11A so that a suitable message may be relayed to a person trapped in the door in the manner to be described below.

The transmitting and receiving coils (not shown) of the invention are arranged to produce signals and be responsive to signals within the region being monitored, in this instance the way in to the bank. One location for these coils is around the entrance as a whole, but a more preferred arrangement is to have the coils formed in a substantially vertical plane, passing behind the wall 11A, across the top of half of the entrance, down the center of spindle 12 and underneath the floor of the entrance. The coils are preferably located in tubing of plastics material. The receiving coils may be contained in the same tubing or be similarly mounted alongside the transmitting coils. An alternative, and also practical, arrangement is to have the receiving coils for the high and low audio-frequency signals located at right angles to the transmitting coils, in which case they will preferably be housed in tubing which has vertical portions behind wall 11A and horizontal portions across the top and bottom thereof.

The oscillators, tuned receivers, logic circuit and alarm components may be located remote from the door itself. There will generally be included in the door arrangement microswitches, photo-electric cell arrangements, proximity switches 16 or the like located atop the door panels or walls. These components are used in a conventional manner to indicate the position of the door, which information is used to ensure that the door is locked in a required position when the alarm is actuated.

The complete alarm system will preferably be DC operated, using a transformer and rectifier arrangement to obtain the power from the mains. A battery source, however, will usually be included, with automatic switching to the battery power should the mains source be interrupted. Such no-break power supply systems are already known and do not constitute an essential feature of the present invention, so will not be described here.

When a person carrying a revolver or other object constructed of high carbon content steel passes into the revolving door, he enters the region monitored by the alarm system. The carried object disturbs the signals being received by the three receiving coils, which results in a change of their output signals to the logic circuit. The altered output signals do not correlate with the normal "safe" comparison result in the logic circuit and if two of the three outputs has changed by a degree corresponding to the presence of gun material, the alarm is actuated by an output signal generated by the logic circuit.

Introduction of other metals into the monitored region will usually cause some change in the outputs of the receivers but the disturbance of the signal will not correspond to the disturbance expected from gun metal and consequently the logic circuit will produce no alarm signal. If required, a signal can be derived from the logic circuit to indicate the presence of another metal in the monitored region by including additional comparison circuits in the logic circuit. Comparison circuits and logic components are known to those skilled in the electronics field and therefore do not need to be described here.

The high audio-frequency signal can be varied between 5 kHz. and 20 kHz. A low audio-frequency signal of 1.75 kHz. has been found satisfactory in practice, but this signal can be varied from 16 Hz. to 5 kHz. DC pulses may be produced at a rate of from one to 16 pulses per second by the pulse generator. The high audio-frequency signal should not be a simple low harmonic of the low frequency signal.

Various circuits can be used to ensure that the alarm is triggered. Two such circuits will be briefly discussed here.

An audio-frequency signal from one of the receiving coils 3, 4 is fed into one arm of a differential amplifier, while a sample of the transmitted signal is fed into the other arm. The difference signal obtained from the differential amplifier, further amplified if necessary, is integrated and applied to the base of a transistor. If the integrated signal is sufficiently large, it renders the transistor conducting. The act of going conducting causes a voltage increase in the collector or emitter circuit of the transistor, which voltage increase is applied to the gate of a thyristor or silicon controlled rectifier to switch it on. Power through the thyristor or S.C.R. is used to actuate a relay or other switching device. A similar circuit is provided for the other receiving coil.

The circuit responsive to the magnetic field perturbation comprises an amplifier to amplify any signal produced by the flux meter 7 upon detection of a residual magnetic field when the DC pulses to coil 5 have been removed. This amplified signal is integrated and applied to the base of a transistor in the same way as in the circuit described in the preceding paragraph. The rest of the circuit is the same as that described for receiving coils 3 and 4.

If at least two of the three relays or other switching devices are actuated, the alarm is given.

A suitable logic circuit comprises three AND-gates, into each of which is fed two signals derived in the same way as the power which is applied to the relays in the circuits described above, except that in the case of receiving coils 3 and 4 the received signal is compared with a standard signal in the differential amplifiers. The first AND-gate will have signals derived from coils 3 and 4, the second from coils 4 and 6, while the third AND-gate will be responsive to signals derived from coils 3 and 6.

Actuation of the alarm can have a multitude of consequences. One of these will almost certainly be the locking of the revolving door in a position to trap the armed person in the quadrant of the door bounded by wall 11A and two panels of the door itself. As indicated above, a message can be transmitted to the entrapped person to advise him of the situation and that if he passes the alarm initiating metal object through the opening 13 and away from the alarm detection area he may, in the absence of the maintenance of the alarm by other metal objects in his possession, be released at the discretion of an officer inside the bank.

Other known effects of raising an alarm, for example, taking photographs, flashing lights, sounding bells or sirens, closing doors and the like, either nearby or in a remote place, can be incorporated into the system as required.

An alternative arrangement of side walls of a revolving door is with each wall extended at both ends in the same way as the innermost part of wall 11A is extended. With this arrangement the revolving door can rotate in both directions, though the monitored region must cover both sides of the doorway. To avoid the possibility of a bank customer being trapped in the opposite quadrant to one containing an armed entrant, a small sliding doorway can be incorporated into each side wall. The sliding doorway in the wall opposite the side where an armed person is entering can be arranged to open automatically when the revolving door stops to permit any innocent person to escape to (for example) the street.

Another advantage of this alternative arrangement is that in the event a person enters the bank and uses a bomb device constructed of a material not detectable by the present invention to successfully rob the bank, an officer inside the bank can operate a manual control to trap the thief in the revolving door as he leaves.

Some places, however, are unable, by reasons of their size or otherwise, to have a revolving door included in their entrance. FIG. 3 shows how the present invention is applied to a common door arrangement. The transmitting and receiving coils are suitably located in, for example, the ceiling and floor in front of the door, or in a wall or two walls extending in front of but beside the door (see FIG. 3), or both sets of coils are located in the ceiling or the floor. When a person enters the mutually sensitive region of the coils, if that person carries a gun, an alarm is actuated and the door is locked so that it cannot be opened by the person setting off the alarm. Appropriate action can then be taken by a person alerted by the alarm.

It will be appreciated that the invention is applicable to sliding doors, swing doors, double doors, and conventional hinged doors. It is also applicable to windows and gates — in fact, to any form of entrance which can be closed.

Where one or more of the receiving coils is located in the ceiling above, or the floor beneath, a region being monitored, two receiving coils and receivers can be used, the second receiver coil being located in the alternative location to the first coil. Such an arrangement is schematically illustrated in FIG. 6, where receiving coils 21 and 22 are located on either side of a region under surveillance. While this corresponds directly to the situation where a door in a corridor or hall is controlled by an alarm system according to the present invention, a parallel set of circumstances pertains to floor and ceiling receiver coil arrangements. The advantage of such double coil arrangements is that the sensitivity of the alarm system can be more directly controlled to respond only to articles of a particular metal having a metal mass greater than a predetermined minimum value. Referring now to FIG. 6, and taking as an example the detection of a gun weighing 500 grams, receiving coils 21 and 22 are connected to relays R1 and R2 respectively. Since a firearm usually weighs at least 500 gms a metal mass of 500 grams is placed at point H and the sensitivity of the coil 21 is adjusted so that it produces a signal just sufficient to trigger relay R1. The same procedure is repeated for coil 22 and relay R2 with the metal mass at point F. It now follows that any metal mass of 500 gms or heavier brought between coils 21 and 22 will trigger both relay R1 and relay R2. In fact, metal masses less than 16 ounces will be detected at various points other than points F and H, for example, a metal mass of 125 grams will be detected at the midpoint G of a line joining points F and H. Metal masses between 4 ounces and 16 ounces will be detectable in various regions extending outwards from point C towards points A and B, the size of the region depending on the mass of metal. This is a consequence of the square law detection phenomenum, the relevant quantity being $$\frac{\text{mass of metal}}{(\text{distance from coil})^2}$$

To provide the required detection level, only when relays R1 and R2 are both activated will the alarm system be activated. As a consequence, however, any metal mass less than 125 grams will not cause activation of the alarm at all.

It is an advantage to have all the electronic circuits and the coils at a constant temperature, for as the temperature of a coil or semiconductor component changes, so does its electrical characteristics. It is possible for a temperature change to cause the high frequency resonance become a harmonic of the low frequency signal. Maintenance of a constant temperature is one of the reasons why the coils have been described as enclosed in non-metallic tubes in the above embodiments of the invention. Air at a constant temperature is circulated around the various circuit components and through the tubes.

For use in the invention, a constant temperature controller has been developed. A circuit diagram of this constant temperature controller is given in FIG. 5.

This temperature controller regulates the supply of power to a heater in such a manner that, as the temperature of the air being controlled rises to its required value, the power supplied is reduced, and at the moment the required temperature of the air is reached, the power to the heater is removed. If the temperature of the air falls below its required value, then heat is applied in an amount dependent upon the difference between the air and the required temperatures. If the temperature of the air falls considerably then a relatively large amount of power is applied to the heater, and as the temperature of the air approaches its required value again, the heat is reduced, gradually, as already indicated, until there is zero heating at the moment the required temperature is attained.

Thus the temperature controller regulates the heat supplied to maintain a body at a steady, required temperature. It comprises a heater, means for sampling the temperature of the air, the sampling means varying a parameter thereof in response to changes in the air temperature, and means dependent upon the variation of said parameter to increase the supply of heat to the air as the difference between the actual temperature of the air and a required temperature thereof increases, and to decrease the supply of energy to the air as said difference decreases, and to supply no energy to the air when the air is at the required temperature.

In the temperature controller illustrated, the sampling means is a thermistor, the parameter which varies being the resistance of the thermistor, the means dependent upon the variations of the parameter is an amplifier and trigger generator, and the heater is controlled by power supplied through silicon controlled rectifiers or thyristors.

Referring now to FIG. 5, the D.C. power for the controller is derived, in the absence of a D.C. power supply, from the A.C. mains supply by transformer TF1 and the rectifier bridge comprising diodes D1, D2, D3 and D4. Zener diode D5 provides a voltage regulating element. The A.C. mains supply is also fed, via thyristors or silicon controlled rectifiers Q1 and Q2 to a load, in this case a heater.

A thermistor TH is suitably located to detect the temperature of the air and is included in the base circuit of transistor TR4 so that variation of the resistance of the thermistor TH causes a variation of the voltage applied to the base of transistor TR4. Also in the base circuit of transistor TR4 is variable resistor R14, the adjustment of which also has an effect on the voltage applied to the base of transistor TR4. The pre-set value of variable resistor R14 is chosen according to the required temperature of the air.

The unit A, shown within dashed lines, is a trigger unit, typically trigger module No. MY5001 produced by Mullard Limited, the details of which are well known to those skilled in the art. A brief description, however, is not out of place here. A potential divider comprising resistors R2 and R3 provides a reference voltage to the base of transistor TR1. Capacitor C2, being initially uncharged, holds transistor TR1 cut off. When the voltage across capacitor C2 exceeds that on the base of transistor TR1, due to a change in the external voltage at point P, transistor TR1 starts to conduct. Positive feedback is supplied through transformer T2 and transistor TR1 bottoms, capacitor C2 discharging through the primary of the transformer T2. As a result of this action, pulses appear between terminals J and K and terminals L and M of the trigger module.

The voltage at P is dependent upon the state of transistor TR2, which is controlled by the base voltage applied to it as a result of current through resistors R12 and R11 and transistor TR3. Transistor TR3, however, is controlled by transistor TR4, which in turn is, as already indicated, governed by the values of resistance of thermistor TH and variable resistor R14. Consequently the resistance of thermistor TH governs the voltage at P, which determines when pulses are generated at terminals J and K and terminals L and M of the trigger circuit.

These pulses are applied to the gates of silicon controlled rectifiers (S.C.R.s) or thyristors Q1 and Q2. Power is only passed by S.C.R.s Q1 and Q2 when a voltage is applied to the gates, so the quantity of power passed will depend, in the case of an A.C. power supply, upon the phase of the pulses applied to the gates relative to the A.C. mains supply. When the pulses are applied at or near the beginning of a mains cycle, or at or near a point where the mains voltage passes through a zero point, very little power will be passed by S.C.R.s Q1 and Q2. The length of the pulse governs the time Q1 and Q2 are conducting. If the pulse is applied at or near the peak value of the mains voltage, then a maximum quantity of power is passed by S.C.R.s Q1 and Q2 for the duration of the pulse. If the apparatus is powered by a D.C. supply, only the duration of the pulses can be used to control the heat applied by the heater.

It will be clear to those persons skilled in the art that a variation of the resistance of thermistor TH, by controlling the voltage at P, causes a variation of the time of applying pulses, and their length and hence the quantity of power passed by S.C.R.s Q1 and Q2. Resistance R14 can be set so that when the air is at the required temperature, no pulses are generated by the trigger module, but the resistance of thermistor TH becomes influential and pulses are generated immediately the temperature of the air drops below the required temperature.

The arrangement of resistors R8 and R9, with capacitor C3, is for suppression purposes. The control of temperature by this means represents a substantial improvement on the prior art.

The controller is, in fact, applicable to other situations than merely the present application. To illustrate its usefulness, in a 0° – 50° C range, using an E208AEP/22K thermistor, a circuit sensitive to 0.0001° C can be constructed, so the body temperature of a liquid can be controlled to ±0.05° C quite easily. In a practical circuit constructed to test the invention, a pulse rise time (to a value of 0.25 to 0.3 volt) of 4 microseconds was obtained, the pulse duration was 10 microseconds and the conduction angle range was between 20° and 150°. This represents a control range of power into the heater of from 3 to 87 percent of the maximum possible power.

It was indicated early in this specification that the invention can be used in airport security systems. FIG. 4 illustrates one way in which the invention an be so used.

The illustrated embodiment of the invention comprises a first corridor having a first revolving door located therein, a second revolving door adjacent said first revolving door and located in or at the end of a second corridor, under normal circumstances said second revolving door being locked in a position preventing entry to said second corridor and said first revolving door being rotatable to permit a person to travel along said first corridor, an alarm system according to the present invention located in or near the swept region of said first revolving door at or near the entry point thereof, said system being operative, upon detection of a gun-metal object, to allow said first revolving door to rotate to a position where the person carrying the metal object cannot proceed in either direction along said first corridor and to lock said first revolving door in that position while rendering said second revolving door rotatable, whereby access to said second corridor is available to said person.

Passengers about to board an aircraft leave the passenger lounge 30 and proceed along a first corridor 31 to their aircraft. A ticket checking point 33 may be included in or near the corridor 31, but this is not an essential feature of the invention. A revolving door 34 is located in corridor 31, and alongside it is a second revolving door 35. Revolving door 35 is at the end of a second corridor 36 and under normal circumstances is held locked in the position shown in the drawing, thus preventing access to corridor 36 from corridor 31 through revolving door 35. Revolving door 34 is rotatable and as long as the alarm system is not actuated, passengers can pass through revolving door 34 and continue along corridor 31. Corridor 36 need not be parallel to corridor 31.

In the dashed-outline region D is located, in the ceiling and floor of the corridor, sets of transmitting and receiving coils of the type referred to earlier in this specification. A person carrying a gun or metal object made out of gun metal who walks between the sets of coils will influence the coupling between the transmitting and receiving coils and will trigger an alarm. In the present invention, along with any conventional alarm response (such as flashing a light, taking a photograph, recording events photographed by a T.V. camera), the triggering of the alarm causes the lock to be removed from revolving door 35 and causes revolving door 34 to become locked to prevent the person triggering the alarm from continuing along corridor 31, i.e., to become locked in the position shown in the drawing with the person (a potential hijacker) required to use revolving door 35 and enter corridor 36 to leave the revolving door region. Once the revolving door 36 has rotated a quarter turn and the potential hijacker has left the region swept by revolving door 34, revolving door 36 is again locked, revolving door 34 is released and travel along corridor 31 can be resumed.

It is preferable, to minimize the disturbance to the flow of passengers along corridor 31, to have revolving door 34 slow down to its locking position rather than stop abruptly. To facilitate this, wall 37 projects into corridor 31. The slowing down of revolving door 34 when the alarm is triggered begins when the potential hijacker is effectively held in revolving door 34 by wall 37. At this point, or shortly thereafter, suitable messages can be relayed, for example by loud-speakers, to passengers in corridor 31 approaching revolving door 34.

A portable version of this embodiment of the invention can also be constructed for use with individual aircraft, with corridors 31 and 36 becoming entry and non-entry paths for the aircraft.

In all embodiments of the invention, it is preferred to have oscillators HFO and LFO in the form of oscillators having their frequencies controlled by tuning forks. Another preferred feature is the continuous checking that the power supply, oscillators, pulse generator, coils, receivers and flux meter are all functioning. If one integer of the invention should fail, then a different type of alarm will be given to advise the malfunction to an operator. An indication of the mass of steel detected by the alarm system may also be included, such indication typically including a meter approximately calibrated for small pistols, large pistols, small rifles and larger firearms.

It is to be understood that embodiments of the invention have been described in this specification and variations can be made and still be within the scope of the invention, as defined by the claims. For example, use of microelectronic techniques may, in the future, permit an alarm system incorporating the present invention to be made of a size sufficient to be carried by one person.

I claim:

1. A metal detection and alarm system comprising a region through or over which a person carrying a metallic object must pass; a first and second oscillator coupled, respectively, to a first and second transmitting coil, each said coil being adapted to produce signals within said region; a first and second receiving coil each responsive to signals within said region and coupled to a first and second receiver, respectively; said first oscillator being adapted to produce a low audio-frequency signal, said second oscillator being adapted to produce a high audio-frequency signal, said first and second receivers being tuned to the frequency of the signals of said first and second oscillators, respectively; a pulse generator adapted to supply D.C. pulses to a magnetic field producing coil to produce a magnetic field within said region, and a third receiving coil coupled to a magnetic flux detector; each of said receivers and said magnetic flux detector being adapted to produce an output signal to be either fed into a logic circuit capable of comparing each said output signal with a respective reference signal or used to actuate a switching device; said logic circuit producing a signal when there is a departure of at least two of said output signals from their respective reference signals or said switching devices providing an output signal on actuation of at least two of said switching devices, said signal from said logic circuit or said switching devices causing actuation of an alarm.

2. A system as claimed in claim 1, in which said low audio-frequency is a frequency in the range 16 Hz. to 5,000 Hz., said high audio-frequency is in the range 5,000 Hz. to 20,000 Hz., and said D.C. pulses are generated at a rate of from one to 16 pulses per second.

3. A system as claimed in claim 2, in which said third receiving coil is disconnected from said magnetic flux detector while one of said D.C. pulses is applied to said magnetic field producing coil and is re-connected to said magnetic flux detector on the termination of the pulse.

4. A system as claimed in claim 3, in which said region comprises a doorway.

5. A system as claimed in claim 4 in which said doorway comprises an entrance including a revolving door having transparent, bullet-proof panels, said revolving door being located between curved side walls, actuation of said alarm being effective to lock said revolving door in a position where a person carrying said metallic object is trapped between two of said panels and one of said side walls.

6. A system as claimed in claim 5, in which said revolving door can rotate in a single direction and the side wall alongside which a person must pass on leaving through side doorway is terminated short of its normal termination point to enable a person locked in the opposite quadrant to a person trapped on actuation of said alarm to leave the proximity of said doorway.

7. A system as claimed in claim 5 in which said side walls each extend around more than one quarter the circumference of the area swept out by said revolving door and each contain a small door therein which is openable when a person is trapped in the quadrant including said other side wall.

8. A system as claimed in claim 6, in which the side wall alongside which a person entering through said doorway must pass has therein a small openable region through which a person trapped by actuation of said alarm can pass the metal object which has actuated said alarm.

9. A system as claimed in claim 7, in which said side walls each have a small openable region through which a person trapped by actuation of said alarm can pass the metal object which has actuated the alarm.

10. A system as claimed in claim 5, in which said revolving door and said side walls are non-metallic.

11. A system as claimed in claim 5, in which at least one of said coils is formed in a vertical plane and has one side located in the center of a spindle upon which the panels of said revolving door are mounted.

12. A system as claimed in claim 1 in which said coils, said oscillators, said pulse generator and said magnetic flux detector are all located within a constant temperature enclosure.

13. A system as claimed in claim 1, in which said region includes a first revolving door located in a first passageway, a second revolving door being located adjacent said first revolving door in or at the end of a second passageway, said second revolving door being normally locked, actuation of said alarm causing said first revolving door to be locked and said second revolving door to be unlocked so that a person carrying said metal object is forced to enter said second passageway.

14. A system as claimed in claim 1, in which said metallic object comprises an object made of high carbon content steel of the type of which firearms are made.

* * * * *